US012184367B1

(12) United States Patent
Sung

(10) Patent No.: US 12,184,367 B1
(45) Date of Patent: Dec. 31, 2024

(54) SYSTEMS AND METHODS FOR CELL-LEVEL BEAMFORMING MODE ADAPTATION

(71) Applicant: T-Mobile Innovations LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 642 days.

(21) Appl. No.: 17/366,927

(22) Filed: Jul. 2, 2021

(51) Int. Cl.
   *H04B 7/06* (2006.01)
   *H04W 24/10* (2009.01)
   *H04W 72/1263* (2023.01)

(52) U.S. Cl.
   CPC ......... *H04B 7/0617* (2013.01); *H04B 7/0626* (2013.01); *H04W 24/10* (2013.01); *H04W 72/1263* (2013.01)

(58) Field of Classification Search
   CPC ... H04B 7/0617; H04B 7/0626; H04W 24/10; H04W 72/1263; H04W 8/005; H04W 72/1268; H04W 72/1273
   See application file for complete search history.

(56) References Cited

U.S. PATENT DOCUMENTS

| 8,605,644 | B2 * | 12/2013 | Wang | H04W 52/325 |
| | | | | 455/452.2 |
| 2012/0057555 | A1 * | 3/2012 | Zhang | H04B 7/0626 |
| | | | | 370/329 |
| 2017/0331670 | A1 * | 11/2017 | Parkvall | H04L 41/0816 |
| 2019/0158160 | A1 * | 5/2019 | Wu | H04B 7/0456 |
| 2019/0222373 | A1 * | 7/2019 | Wu | H04L 5/0023 |
| 2019/0313436 | A1 * | 10/2019 | Lee | H04L 5/0051 |
| 2020/0367268 | A1 * | 11/2020 | Tijoriwala | H04W 72/02 |
| 2020/0412417 | A1 * | 12/2020 | Calzolari | G06N 3/084 |
| 2021/0127369 | A1 * | 4/2021 | Ma | H04L 5/0048 |
| 2021/0250069 | A1 * | 8/2021 | Yu | H04B 7/0632 |

* cited by examiner

*Primary Examiner* — Ian N Moore
*Assistant Examiner* — Latresa A McCallum
(74) *Attorney, Agent, or Firm* — Shook, Hardy & Bacon L.L.P.

(57) ABSTRACT

Methods, media, and systems are provided for adapting a beamforming mode based on channel state information. The methods, media, and systems receive, at a base station associated with an antenna array, the channel state information from one or more devices. Based on the channel state information, the methods, media, and systems determine whether an uplink signal measurement is above a first threshold and whether a downlink signal measurement is above a second threshold. Based on whether the uplink signal measurement is above the first threshold and whether the downlink signal measurement is above the second threshold, the methods, media, and systems instruct one or more antenna elements corresponding to the antenna array to schedule wireless transmissions utilizing closed-loop beamforming or open-loop beamforming.

16 Claims, 6 Drawing Sheets

SYSTEMS AND METHODS FOR CELL-LEVEL BEAMFORMING MODE ADAPTATION

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for adapting a cell-level beamforming mode, substantially as shown in and/or described in connection with at least one of the figures, and as set forth more completely in the claims.

In aspects set forth herein, and at a high level, a beamforming mode is adapted based on channel state information. A base station associated with an antenna array receives channel state information from one or more devices. Based on the channel state information, a processor determines whether an uplink signal measurement is above a first threshold and whether a downlink signal measurement is above a second threshold. Based on whether the uplink signal measurement is above the first threshold and whether the downlink signal measurement is above the second threshold, an instruction is provided to one or more antenna elements corresponding to the antenna array to schedule wireless transmissions utilizing closed-loop beamforming or open-loop beamforming.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
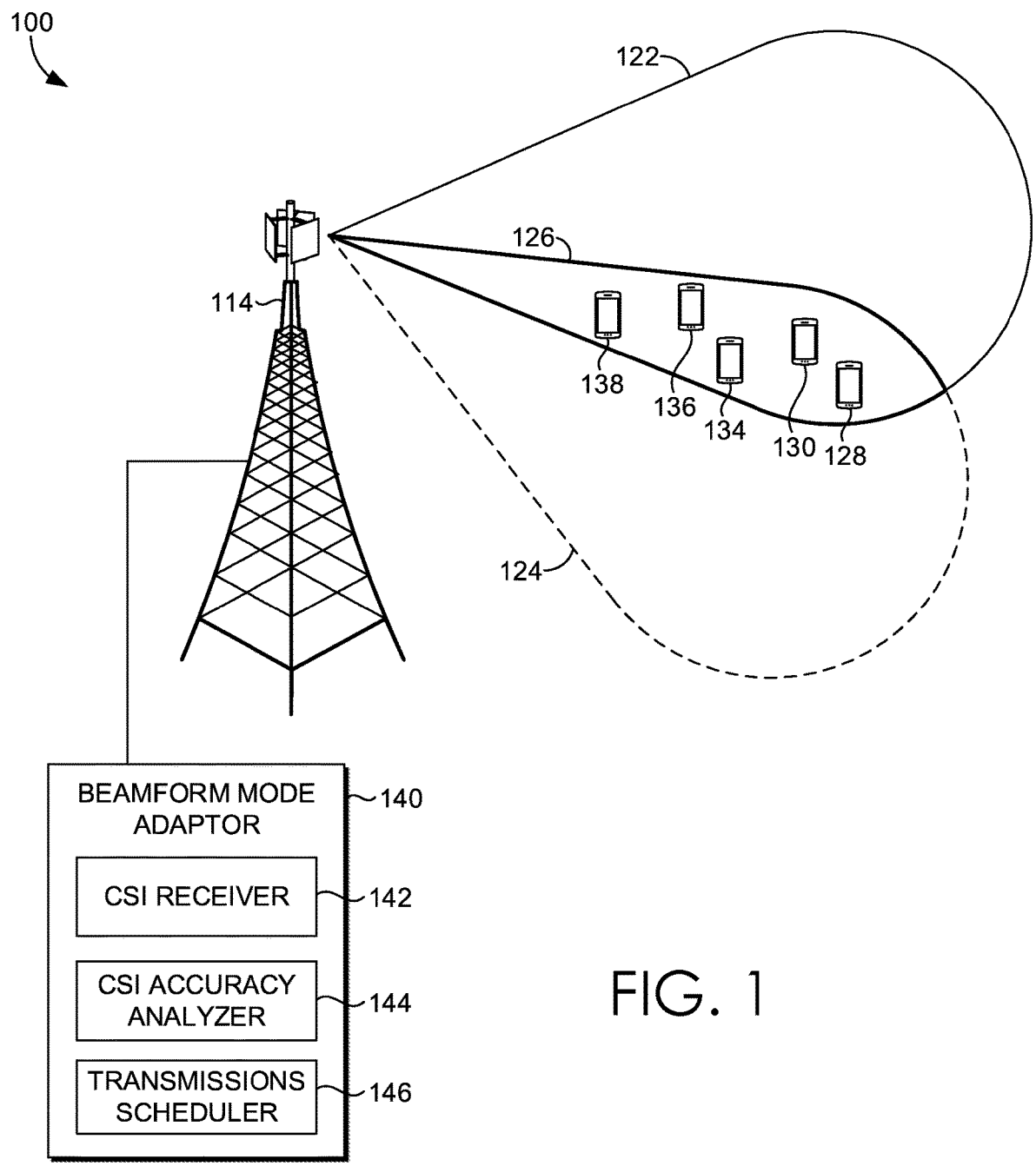
FIG. 1 depicts a diagram of an example cell-level beamforming network environment for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| CD-ROM | Compact Disk Read Only Memory |
| CDMA | Code Division Multiple Access |
| CSI | Channel Signal Information |
| CSI-RS | Channel State Information Reference Signal |
| DMRS | Demodulation Reference Signal |
| eNB | Evolved Node B |
| FDD | Frequency Division Duplex |
| gNB | Next Generation Node B |
| GPRS | General Packet Radio Service |
| GSM | Global System for Mobile communications |
| DVD | Digital Versatile Discs |
| EEPROM | Electrically Erasable Programmable Read Only Memory |
| LTE | Long Term Evolution |
| PC | Personal Computer |
| PDA | Personal Digital Assistant |
| PMI | Pre-Coding Matrix Indicator |
| RAM | Random Access Memory |
| RF | Radio-Frequency |
| ROM | Read Only Memory |
| RSRP | Reference Transmission Receive Power |
| RSRQ | Reference Transmission Receive Quality |
| SINR | Transmission-to-Interference-Plus-Noise Ratio |
| SRS | Sounding Reference Signal |
| SSB | Synchronization Signal Block |
| TDD | Time Division Duplex |
| TDMA | Time Division Multiple Access |
| UL | Uplink |

Further, various technical terms are used throughout this description. An illustrative resource that fleshes out various aspects of these terms can be found in Newton's Telecom Dictionary, 31st Edition (2018).

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions-including data structures and program modules-in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, conventional systems relating to beamforming waste more energy related to both base stations and UEs by failing to adapt beamforming modes based on particular UE uplink and downlink information. These conventional systems, for example, fail to conserve the limited energy corresponding to a battery of a node. Further, electromagnetic waves from the conventional systems failing to utilize the proper beamforming mode create interferences at receivers, increase transmission range, use more power, and fail to properly allocate work and information. Additionally, feedback delays in conventional methods are more common because of the failure of the conventional methods to adapt beamforming modes based on particular UE uplink and downlink information.

The systems and methods provided herein can alleviate the problems discussed above. For instance, in aspects, the systems disclosed herein can optimally employ benefits of energy beamforming to improve energy transfer efficiency. By adapt beamforming modes based on particular UE uplink and downlink information, the present technology disclosed herein saves energy by conserving the battery life of nodes, reduces interferences at receivers, reduces one or more transmission ranges and the corresponding energy required to do so, wastes less power, and properly allocates work and information across the system.

Accordingly, in one aspect, a system for adapting a beamforming mode comprises an antenna array having one or more antenna elements and one or more processors configured to execute operations. The operations comprise receiving, at a base station associated with the antenna array, channel state information from one or more devices. Further, based on the channel state information, the operations determine whether an uplink signal measurement is above a first threshold and whether a downlink signal measurement is above a second threshold. Furthermore, based on whether the uplink signal measurement is above the first threshold and whether the downlink signal measurement is above the second threshold, the operations instruct the one or more antenna elements to schedule wireless transmissions utilizing closed-loop beamforming or open-loop beamforming.

In another aspect, a computerized method for adapting a beamforming mode performs the steps comprising receiving channel state information corresponding to UE uplink and downlink measurements. Based on the channel state information, the method determines that an uplink signal measurement is above a first threshold. Based on the channel state information, the method determines whether a downlink signal measurement is above a second threshold. Further, the method instructs an antenna element to schedule wireless transmissions utilizing open-loop beamforming.

In yet another aspect, non-transitory computer-readable storage media having computer-executable instructions embodied thereon that, when executed by one or more processors, cause the one or more processors to perform operations. For example, the operations include receiving cell-level channel state information. Additionally, based on the cell-level channel state information, the operations include determining that an uplink signal measurement is below a first threshold. Based on the cell-level channel state information, the operations include determining whether a downlink signal measurement is above a second threshold. Further, the operations include instructing an antenna element to schedule wireless transmissions utilizing closed-loop beamforming.

As used herein, a UE (also referenced herein as a "user device" or "device") can include any device employed by an end-user to communicate with a wireless telecommunications network. A UE can include a mobile device, a mobile broadband adapter, an IoT device, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 6.

FIG. 1 depicts a diagram of an example cell-level beamforming network environment 100 suitable for use in implementations of the present disclosure. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes cell site 114, coverage area 122, coverage area 124, beam configuration 126, multiple user devices (UEs 128, 130, 134, 136, and 138), and a beamform mode adaptor 140. The beamform mode adaptor comprises CSI receiver 142, CSI accuracy analyzer 144, transmissions scheduler 146. The UEs may take on a variety of forms including: a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device (such as the computing device 600 in FIG. 6) that communicates via wireless communications to interact with a public or private network. In some embodiments, UEs 128, 130, 134, 136, and 138 are mid-cell UEs, or user devices that are not located at the cell edge of coverage area 122 and coverage area 124. In other embodiments, UEs 128, 134, and 138 are cell edge user devices with respect to coverage area 122.

In aspects, UEs 128, 130, 134, 136, and 138 may be capable of communicating using 4G (e.g., LTE) and/or 5G.

In some aspects, UEs 128, 130, 134, 136, and 138 may be E-UTRAN New Radio-Dual Connectivity devices (ENDC). ENDC allows a user device to connect to an LTE eNodeB that acts as a master node and a 5G gNodeB that acts as a secondary node. As such, in these aspects, UEs 128, 130, 134, 136, and 138 may access both LTE and 5G simultaneously, and in some cases, on the same spectrum band. As shown in FIG. 1, UEs 128, 130, 134, 136, and 138 communicate by way of transmission with base station 114 using one or more of 4G and 5G, sometimes simultaneously. Additionally, other wireless communication protocols may be utilized in conjunction with aspects described herein, as LTE and 5G are used for exemplary purposes only and not for limitation.

Turning to cell site 114, the terms "cell site" and "base station" may be used interchangeably herein to refer to a defined wireless communications serviceable area that is serviced by a base station. Cell site 114 may provide wireless communication services to UEs 128, 130, 134, 136, and 138. In particular, cell site 114 may be configured to wirelessly communicate with the UEs, which are located within a serviceable area defined by a transmission range and/or receiving range of the radio antennas of the cell site 114.

Cell site 114 may include one or more carriers, band pass filters, radios, antennas, antenna arrays, power amplifiers, transmitters/receivers, digital signal processors, control electronics, GPS equipment, and the like. As discussed herein, cell site 114 is deployed in a network to control and facilitate, via one or more antenna arrays, the broadcast, transmission, synchronization, and receipt of one or more wireless signals in order to communicate with, verify, authenticate, and provide wireless communications service coverage to one or more UEs and/or other types of devices that request to join and/or are connected to the network.

In some aspects, cell site 114 may comprise one or more macro cells (providing wireless coverage for users within a large serviceable area). For example, macro cells may correspond to a coverage area having a radius of approximately 1-15 miles or more, the radius measured at ground level and extending outward from an antenna at the cell site. In some aspects, cell site 114 may comprise, or be in communication with, one or more small cells (providing wireless coverage for users within a small geographic area). For example, a small cell may correspond to a coverage area having a radius of approximately less than three miles, the radius measured at ground level and extending outward from an antenna at the cell site. In embodiments, cell site 114 is in communication with a plurality of in-door small cells. In some embodiments, the network environment includes a heterogeneous network having both the one or more small cells and the one or more macro cells.

Furthermore, the one or more small cells may support mmWaves via mmWave nodes corresponding to an antenna. Additionally, the one or more small cells may combine a plurality of 100 MHz channels. Continuing the example, the one or more small cells may also combine radio and antenna elements. Further, the one or more small cells may each have an Ethernet cable backhaul. Additionally, the one or more small cells may have the capability of transferring data to multiple user devices during a single point in time via a plurality of antennas (e.g. via a multi-user MIMO antenna system).

In some embodiments, cell site 114 comprises at least a first antenna array having one or more antenna elements. In aspects, the one or more antenna elements may be dipole antennas having a length, for example, of ¼, ½, 1, or 1½ wavelength. In aspects, the first antenna array may be an active antenna array, FD-MIMO, massive MIMO, 3G, 4G, 5G, another generation communication system, and/or 802.11. In other aspects, the first antenna array may comprise monopole, loop, parabolic, traveling-wave, aperture, yagi-uda, conical spiral, helical, conical, radomes, horn, and/or apertures, or any combination thereof.

By way of a non-limiting example, the first antenna array may comprise 64 antenna elements arranged in an 8×8 structure. In other aspects, the first antenna array may comprise antenna elements arranged in an 8×4, 4×8, or 4×4 configuration. Each antenna element of the first antenna array may have a dedicated power supply that supplies power having a certain phase and amplitude to a respective antenna element. In an aspect, the power supply comprises a power amplifier. In various aspects, the power supply may additionally comprise a processor for controlling or adjusting the power supply to the respective antenna element. In some aspects, each power supply may have a maximum power to supply to its respective antenna element. In aspects, the maximum per-antenna supply power may be 2.5 W, 3.5 W, 4 W, 5 W, or more.

Turning to CSI receiver 142, the receiver 142 may retrieve and/or receive data from UES, various networks, databases, other cell sites, and other devices. In some embodiments, the receiver 142 may receive various CSI from UEs corresponding to various coverage areas. Additionally, receiver 142 may retrieve this information at various times (e.g., at specific times each day, within predetermined time periods, etc.). Continuing the example, the cell site 114 may receive channel signal feedback via a feedback reporting procedure. The feedback may include antenna configuration, SINR, the type of the UE receiver, etc. The receiver 142 may receive UE reports, which were based on downlink transmissions from the cell site 114, the UEs transmit via uplink channels at predetermined time intervals.

Receiver 142 receives information from various UEs in communication with the cell site 114, the UEs being configured to receive a multiple port (multi-port) CSI-RS pattern from an eNB at the corresponding UE. The multi-port CSI-RS pattern is associated with multiple antenna ports. The UEs are further configured to calculate an RSRP and/or an RSRQ for each antenna port associated with the CSI-RS pattern. The UEs are further configured to communicate the feedback reporting, comprising the RSRP and/or the RSRQ for each antenna port, to the eNB. In one embodiment, the UEs are further configured to select an antenna port having a highest received power or a highest received quality and provide feedback to the eNB of the selected antenna port.

In some embodiments, CSI includes CSI from both transmitter and receiver of a corresponding UE. In some embodiments, CSI from the UE transmitter is different than that of the receiver. In some embodiments, CSI includes an uplink signal measurement that is a sound reference signal, an uplink signal measurement that is a demodulation reference signal, a downlink signal measurement comprising a measurement from a precoding matrix indicator report and/or a measurement from a synchronization signal block beam index, a downlink signal measurement based on a block error rate, and/or a downlink signal measurement based on a SINR.

In embodiments, the CSI is quantized to reduce a size of the feedback received by the receiver 142. In embodiments, the receiver 142 receives precoding matrices corresponding to a channel. In some embodiments, feedback received by the receiver 142 includes slow-fading and fast-fading information corresponding to a channel. As such, with respect to fast-fading and slow-fading, the receiver 142 may also receive information corresponding to Doppler spread, coherence time, symbol periods, changes to impulse responses, mobility, signal path change, shadowing, instances of physical obstructions, constructive interference patterns, destructive interference patterns, and so forth.

Other channel information may include one or more qualities of communication between one or more user devices and particular antennas of base station 114. For example, one or more processors may quantify how communications are traveling over a particular channel, thus indicating when communications performance is negatively impacted or impaired. As such, CSI may indicate a realized uplink and/or downlink transmission data rate of a cell site and/or each of one or more user devices communicating with the cell site, observed SINR and/or signal strength at the user device(s), or throughput of the connection between the cell site and the user device(s). The receiver 142 may also be configured to receive information from cell sites other than cell site 114 or other processors and/or servers.

Furthermore, additional data the receiver 142 may access includes, but is not limited to, location information of the UEs. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example.

Turning to accuracy analyzer 144, accuracy analyzer 144 can determine whether an uplink signal measurement is above a first threshold and whether a downlink signal measurement is above a second threshold. In embodiments, accuracy analyzer 144 a UE location information in addition to CSI to determine whether the uplink signal measurement is above the first threshold and whether the downlink signal measurement is above the second threshold. Accuracy analyzer 144 may use location information, CSI, and information about a corresponding UE's capability, such as the number of antennas of the user device and the type of receiver used by the user device for detection, to determine whether uplink signals or downlink signal measurements are above one or more thresholds.

Accuracy analyzer 144 can analyze the reduced size of the feedback, can extract particular information from the feedback and at a particular rate, and can analyze fast-fading and slow-fading information to further determine whether the uplink signal measurement is above the first threshold and whether the downlink signal measurement is above the second threshold. In some embodiments, accuracy analyzer 144 analyzes feedback comprising an SSB/CSI-RS Beam index report, a CSI-RS PMI report, or a UL SRS/UL DMRS to determine whether the uplink signal measurement is above the first threshold and whether the downlink signal measurement is above the second threshold.

The first and second thresholds may vary depending upon the particular feedback analyzed. For example, the first threshold may decrease based on a delay corresponding to uplink sounding. Further, the second threshold may decrease based on a delay corresponding to a channel reciprocity property used to obtain a downlink measurement signal. In an embodiment, the uplink sounding is used in a TDD system. As such, accuracy analyzer 144 determines that the thresholds may vary depending on whether the system is a TDD or an FDD system. In some embodiments, the first threshold will vary depending on whether one or more uplink sound reference signals and DMRS were analyzed. In some embodiments, the second threshold will vary depending on whether a downlink signal measurement was determined from a PMI report, a synchronization signal block beam index, or a block error rate.

Accuracy analyzer 144, in some embodiments, can analyze for reducing or eliminating ambiguity in CSI reporting. For example, a component carrier corresponding to coverage area 122 or coverage area 124 may be in an unlicensed RF band. In some embodiments, a component carrier corresponding to coverage area 122 is in the unlicensed RF band and a component carrier corresponding to coverage area 124 is in a licensed RF band. Continuing the example, accuracy analyzer 144 may lessen or remove ambiguity from CSI by enabling base station 114 to configure a reporting option (e.g., whether a UE will transmit the channel state information regardless of a successful clear channel assessment for access to a component carrier for a gating interval, when channel state information is to be reported, etc.) and identifying the component carrier associated with the CSI.

In some embodiments, accuracy analyzer 144 determines that the uplink signal measurement is above the first threshold and that the downlink signal measurement is above the second threshold. In some embodiments, accuracy analyzer 144 determines that the uplink signal measurement is above the first threshold and that the downlink signal measurement is below the second threshold. In some embodiments, accuracy analyzer 144 determines that the uplink signal measurement is below the first threshold and that the downlink signal measurement is above the second threshold. In some embodiments, accuracy analyzer 144 determines that the uplink signal measurement is below the first threshold and that the downlink signal measurement is below the second threshold.

In some embodiments, the uplink signal corresponds to a plurality of UEs located within a predetermined range from a location corresponding to a coverage area (e.g., coverage area 122 or coverage area 124. In some embodiments, the uplink signal measurement corresponds to a plurality of UEs located within a predetermined range from UE 136 (or another UE not depicted within coverage area 122). In some embodiments, the downlink signal measurement corresponds to the same plurality of UEs in which the uplink signal measurement corresponds to. In some embodiments, the downlink signal measurement corresponds to only one or a portion of the same plurality of UEs in which the uplink signal measurement corresponds to. In some embodiments, the downlink signal measurement corresponds both the same plurality of UEs in which the uplink signal measurement corresponds to and additionally a different plurality of UEs.

Turning to transmissions scheduler 146, transmissions scheduler 146 has the base station and/or other nodes use at least one antenna array having antenna elements provide beamforming for communication over a sub-6 GHz band. Further, a large number of the antenna elements may be used for beamforming for communication over an mmWave band. Additionally, the base station 114 may communicate with another node using frequency-division-multiplexing. As such, transmissions scheduler 146 enables a controller to manage one or more adaptive beamforming antennas, the managing comprising changing a direction of the one or more adaptive beamforming antennas, adjusting one or more signal strengths towards one or more particular directions, and/or other beamforming functions.

Further, transmissions scheduler 146 may manage beamforming by scheduling a combination of signals communicated via antenna elements of an antenna array. The beamforming includes some signals that are propagating at one or more particular orientations, with respect to the antenna array, and experiencing constructive interference (while other signals are experiencing destructive interference). Transmissions scheduler 146 adjusts signals communicated via the antenna elements by a transmitting device or a receiving device applying amplitude offsets, phase offsets, or a combination of both to signals carried via the antenna elements associated with the corresponding device. A beamforming weight set associated with a particular orientation (e.g., with respect to the antenna array of the transmitting device or the receiving device, or some other orientation) defines the adjustments associated with each of the antenna elements.

In some embodiments, the transmissions scheduler 146 applies a first set of beamforming weights to a first set of antenna elements based on the determination of whether the uplink signal measurement is above the first threshold and whether the downlink signal measurement is above the second threshold. In some embodiments, a digital chain is cascaded with a plurality of antenna elements for purposes of transmission or reception. Further, transmissions scheduler 146 may combine signals in the RF domain based on analog beamforming constraints so that a receiving node (such as the base station 114 or one of the UEs, etc.) may also see combined signal from multiple antenna elements. Continuing the example, because of the combined signals in the RF domain, the receiving node may not know the channel at individual antenna elements or different subsets of antenna elements. As such, transmissions scheduler 146 provides for one or more sounding channels from a transmitting node to a receiving node so that the receiving node may convey channel information to the transmitting node for communications thereafter using one or more different antenna element subsets associated with an established beam.

Further, in some embodiments, transmissions scheduler 146 instructs the one or more antenna elements to schedule wireless transmissions utilizing open-loop beamforming upon the determination that the uplink signal measurement is above the first threshold and that the downlink signal measurement is above the second threshold. In some embodiments, transmissions scheduler 146 instructs the one or more antenna elements to schedule the wireless transmissions utilizing the open-loop beamforming upon determining that the uplink signal measurement is above the first threshold and that the downlink signal measurement is not above the second threshold.

In some embodiments, transmissions scheduler 146 instructs the one or more antenna elements to schedule the wireless transmissions utilizing the closed-loop beamforming upon determining that the uplink signal measurement is not above the first threshold and that the downlink signal measurement is not above the second threshold. In some embodiments, transmissions scheduler 146 instructs the one or more antenna elements to schedule the wireless transmissions utilizing the closed-loop beamforming upon determining that the uplink signal measurement is not above the first threshold and that the downlink signal measurement is above the second threshold.

In some embodiments, transmissions scheduler 146 instructs the one or more antenna elements to schedule the wireless transmissions utilizing the closed-loop beamforming or the open-loop beamforming on a per-cell level. For example, as depicted in FIG. 1, transmissions scheduler 146 instructs the one or more antenna elements corresponding to base station 114 to schedule the wireless transmissions utilizing beam configuration 126. In some embodiments, beam configuration 126 is closed-loop. In some embodiments, beam configuration 126 is open-loop. In some embodiments, beam configuration 126 uses higher dimension MIMO capabilities to exploit 3D beamforming in both elevation and azimuth beamforming to increase a coverage and/or a capacity. In some embodiments, UEs 128, 130, 134, 136, and 138 feed back precoding matrices to the base station 114 to boost beam configuration 126 power gain.

Figure 2:
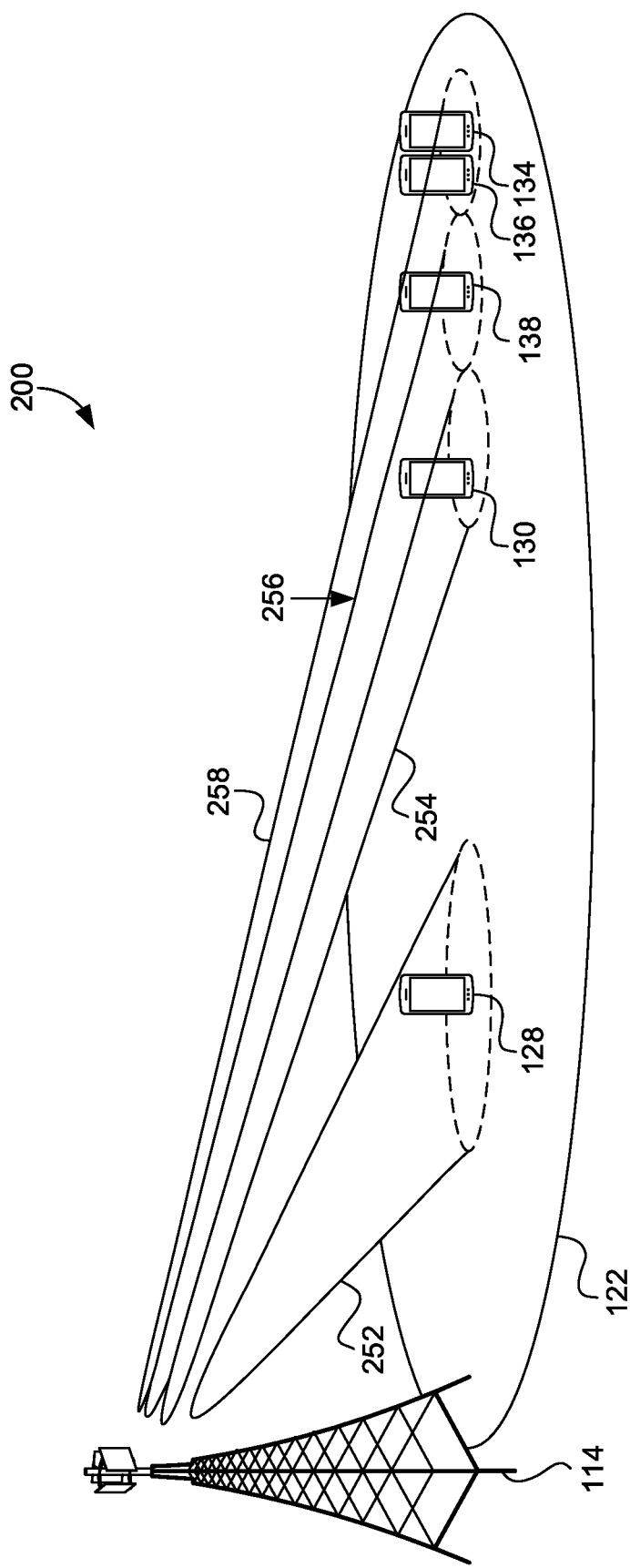
FIG. 2 illustrates a diagram of an example UE-specific cell beamforming network environment in which implementations of the present disclosure may be employed, in accordance with aspects herein.

Turning to FIG. 2, example UE-specific cell beamforming network environment 200 comprises base station 114; coverage area 122; UEs 128, 130, 134, and 138; and beam configurations 252, 254, 256, and 258. An antenna array corresponding to the base station 114 may be employed to configure UE-specific beam configurations 252, 254, 256, and 258. For example, beam configuration 252 is directed to an area where UE 128 is located; beam configuration 254 is directed to an area where UE 130 is located; beam configuration 256 is directed to an area where UE 138 is located; and beam configuration 258 is directed to an area where UEs 136 and 134 are located. In some embodiments, the antenna array antenna array corresponding to the base station 114 can adjust horizontal directionality of beam configurations 252, 254, 256, and 258. In some embodiments, both the vertical and horizontal directivity can be used to change a width or height of the beam configurations 252, 254, 256, and 258.

In one embodiment, UEs 128, 130, 134, and 138 can be configured to receive CSI-RS from an eNB. Continuing the example, the CSI-RS can be configured to provide information for multiple vertical beam configurations, such as beam configurations 252, 254, 256, and 258. Further, UEs 128, 130, 134, and 138 can communicate a feedback report to the eNB to enable the eNB to construct UE-specific beam configurations 252, 254, 256, and 258 based on the feedback reports received from the UEs, the feedback reports comprising RSRP messages and/or RSRQ messages.

In some embodiments, the phases of one or more antenna elements or antenna arrays can be adjusted to provide vertical and/or horizontal movement of the beam in relation to UEs 128, 130, 134, and 138. Further, the movement of the beam relative to the location of the corresponding UE can be used to provide a cell power and a signal quality for UEs 128, 130, 134, and 138. In one embodiment, to construct the beam configurations 252, 254, 256, and 258, an iterative process can be used wherein one or more UEs 128, 130, 134, and 138 provide feedback reports to the eNB. The iterative process can continue until one or more of the beam configurations 252, 254, 256, and 258 are optimized with respect to the relevant UE(s). In some embodiments, beam configurations 252, 254, 256, and 258 are grouped for multiple UEs. For example, cell site 114 can construct a UE-specific cell for a single UE and/or a group UE-specific cell for multiple UEs.

Figure 3:
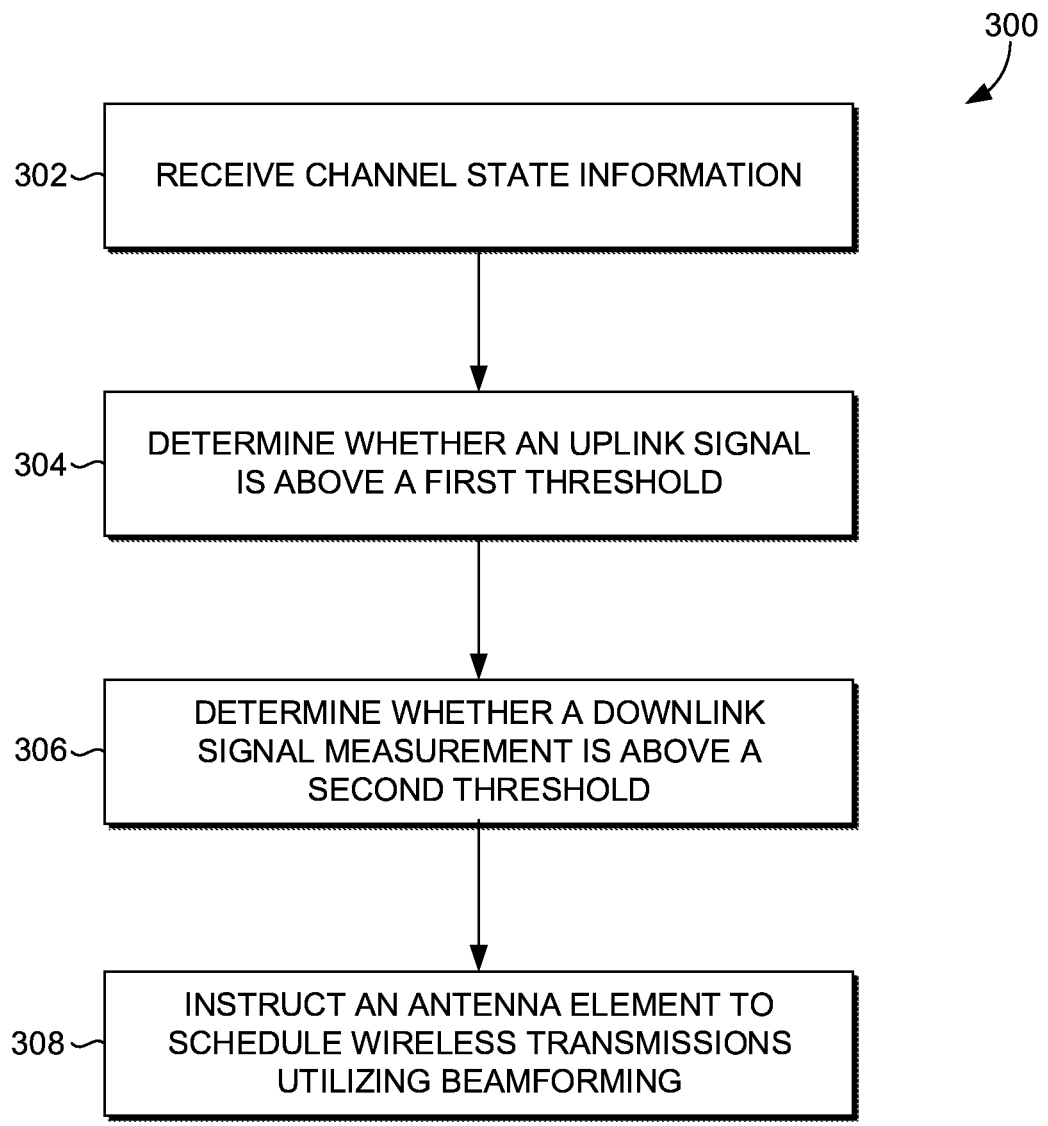
FIG. 3 depicts a flow diagram of an example method for use in implementations of the present disclosure, in accordance with aspects herein.

Turning now to FIG. 3, flowchart 300 corresponding to a computerized method begins with receiving channel state information at 302. The channel state information may be associated with an antenna array corresponding to a base station. Further, at step 304, the method determines whether an uplink signal measurement is above a first threshold. At step 306, the method includes determining whether a downlink signal measurement is above a second threshold. In some embodiments, the downlink signal measurement comprises a measurement from a precoding matrix indicator report and a measurement from a synchronization signal block beam.

Turning to step 308, the method instructs the one or more antenna elements to schedule wireless transmissions utilizing closed-loop beamforming or open-loop beamforming based on whether the uplink signal measurement is above the first threshold and whether the downlink signal measurement is above the second threshold. In some embodiments, the one or more antenna elements are instructed to schedule the wireless transmissions utilizing the open-loop beamforming in response to determining that the uplink signal measurement is above the first threshold and that the downlink signal measurement is above the second threshold. In some embodiments, the one or more antenna elements are instructed to schedule the wireless transmissions utilizing the open-loop beamforming in response to determining that the uplink signal measurement is above the first threshold and that the downlink signal measurement is below the second threshold.

In some embodiments, the one or more antenna elements are instructed to schedule the wireless transmissions utilizing the closed-loop beamforming in response to determining that the uplink signal measurement is at or below the first threshold and that the downlink signal measurement is above the second threshold. In some embodiments, the one or more antenna elements are instructed to schedule the wireless transmissions utilizing the closed-loop beamforming in response to determining that the uplink signal measurement is below the first threshold and that the downlink signal measurement is below the second threshold.

Figure 4:
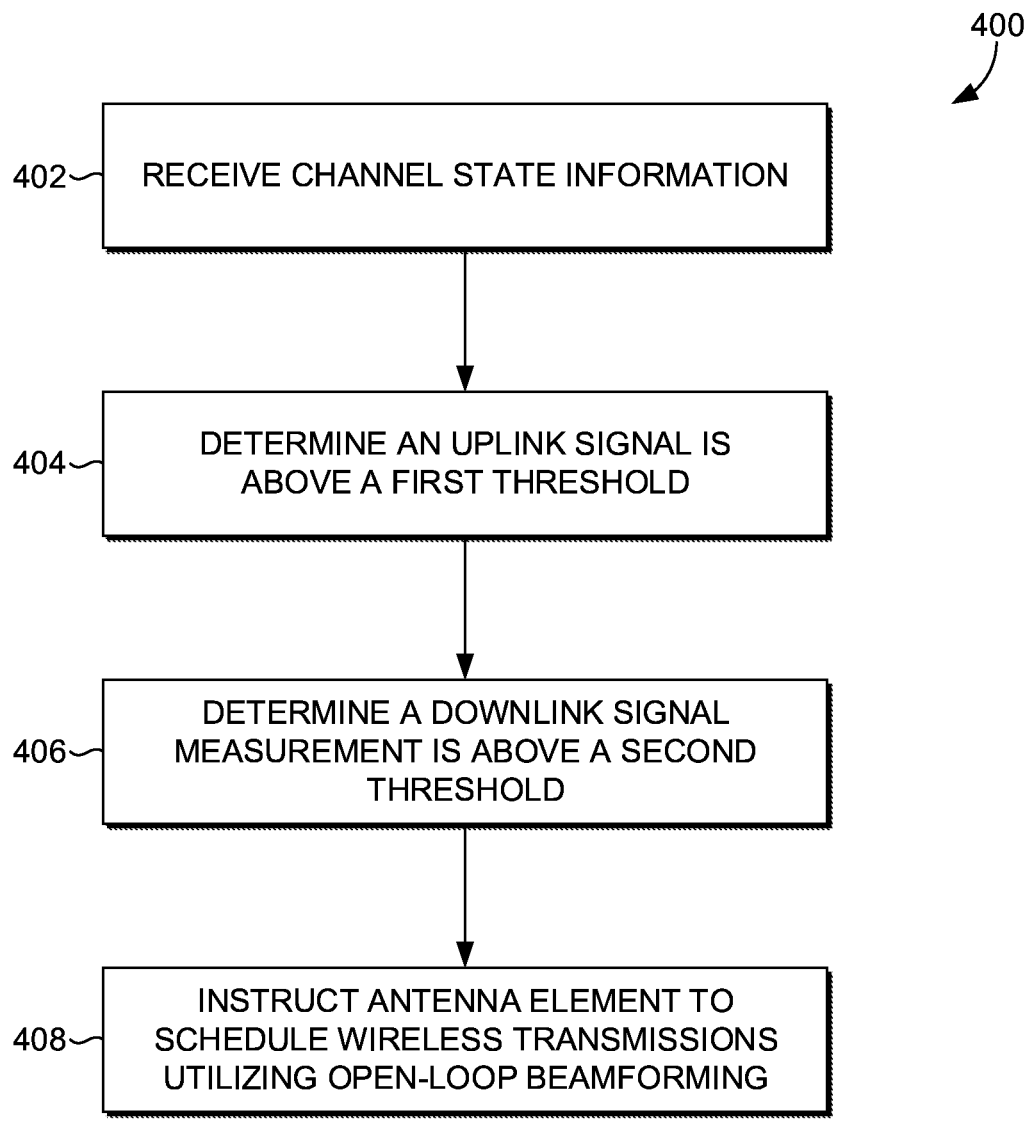
FIG. 4 depicts a flow diagram of an example method for use in implementations of the present disclosure, in accordance with aspects herein.

Turning now to FIG. 4, flowchart 400 corresponding to a computerized method begins with receiving channel state information at 402. At step 404, the method includes determining that an uplink signal measurement is above a first threshold based on the channel state information. In some embodiments, the uplink signal measurement is a demodulation reference signal. In some embodiments, the uplink signal measurement further comprises a sound reference signal. Further, the method includes determining whether a downlink signal measurement is above a second threshold at step 406. In some embodiments, the downlink signal measurement comprises a measurement from a precoding matrix indicator report and a measurement from a synchronization signal block beam index.

Further, at step 408, the method comprises instructing an antenna element to schedule wireless transmissions utilizing open-loop beamforming. In some embodiments, the wireless transmissions utilizing the open-loop beamforming are scheduled for a cell-level. In some embodiments, the wireless transmissions utilizing the open-loop beamforming are scheduled for grouping multiple UEs within a particular area. In some embodiments, the method further comprises dynamically instructing the antenna element to schedule the wireless transmissions utilizing closed-loop beamforming upon a later determination that the uplink signal measurement is below the first threshold.

Figure 5:
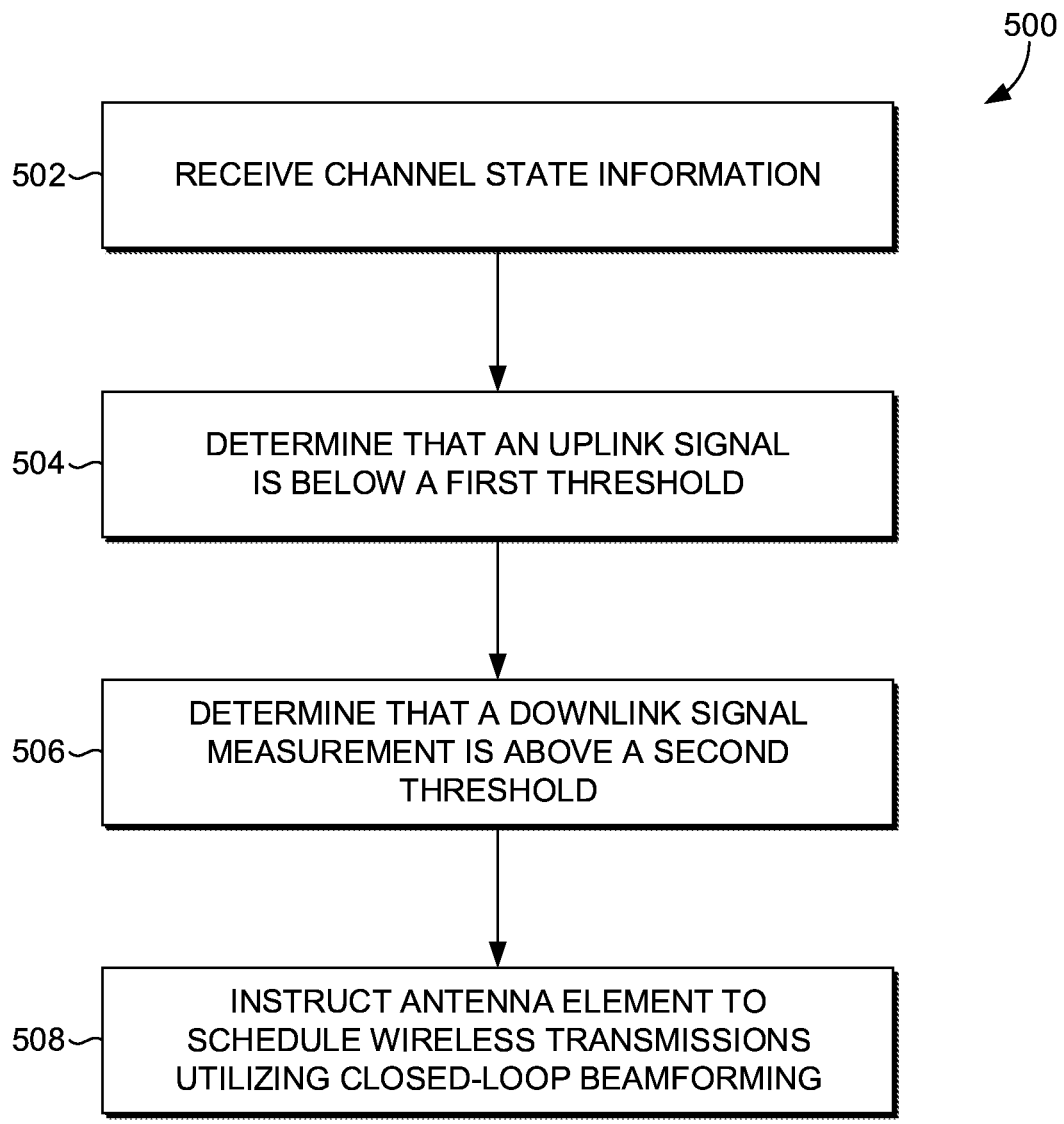
FIG. 5 depicts a flow diagram of another example method for use in implementations of the present disclosure, in accordance with aspects herein.

Turning now to FIG. 5, flowchart 500 corresponding to a computerized method begins with receiving cell-level channel state information at 502. In some embodiments, additional cell-level channel state information is received periodically from a plurality of user devices. The cell-level channel state information may correspond to antenna elements of one or more antenna arrays. The one or more antenna arrays may correspond to a base station or to two different access node. In some embodiments, the cell-level channel state information is obtained from an access node neighboring the access node corresponding to an antenna element providing a telecommunication service with the UE in which the cell-level channel state information was obtained.

Turning to step 504, based on the cell-level channel state information, the method determines that an uplink signal measurement is below a first threshold. In some embodiments, determining that the uplink signal measurement is above the first threshold is based on the additional cell-level channel state information. Further, the method includes determining a downlink signal measurement is above a second threshold based on the cell-level channel state information at step 506. In some embodiments, the downlink signal measurement is based on a block error rate. In some embodiments, the downlink signal measurement is based on a signal-to-noise ratio.

Further, the method includes instructing an antenna element to schedule wireless transmissions utilizing closed-loop beamforming at step 508. In some embodiments, the method further comprises dynamically instructing the antenna element to schedule the wireless transmissions utilizing open-loop beamforming upon determining that the uplink signal measurement is above the first threshold at a later time based on the additional cell-level channel state information. Further, in some embodiments, the method further comprises obtaining the cell-level channel state information from an access node neighboring the access node corresponding to the antenna element and determining the first threshold based on the obtaining.

Figure 6:
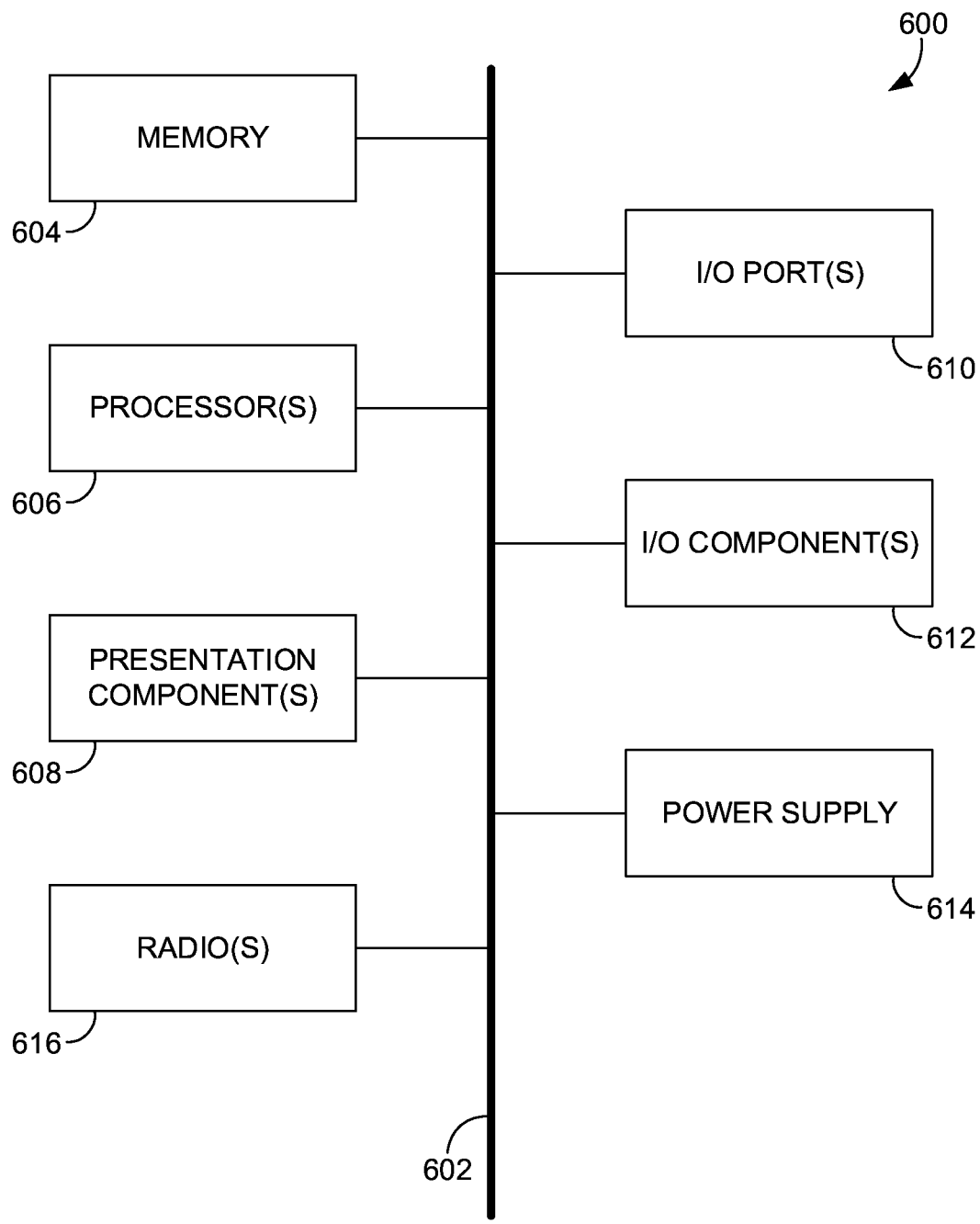
FIG. 6 depicts an exemplary computing environment suitable for use in implementations of the present disclosure, in accordance with aspects herein.

Turning now to FIG. 6, a diagram is depicted of an exemplary computing environment suitable for use in implementations of the present disclosure. In particular, the exemplary computer environment is shown and designated generally as UE/user device 600. User device 600 is but one example of a suitable computing environment and is not intended to suggest any limitation as to the scope of use or functionality of the invention. Neither should user device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, user device 600 includes bus 602 that directly or indirectly couples the following devices: memory 604, one or more processors 606, one or more presentation components 608, input/output (I/O) port(s) 610, I/O component(s) 612, power supply 614, and radio(s) 616. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O component(s) 612. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "user device."

User device 600 typically includes a variety of computer-readable media. Computer-readable media can be any available media that can be accessed by user device 600. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 604, memory 604 includes computer-storage media in the form of volatile and/or nonvolatile memory. Memory 604 may be removable, nonremovable, or a combination thereof. Examples of memory 604 include solid-state memory, hard drives, optical-disc drives, etc. For instance, memory 604 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 606, the one or more processors 606 read data from various entities such as bus 602, memory 604 or I/O component(s) 612. The one or more processors 606 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 606 execute instructions, for example, of an Operating System of the user device 600 and/or of one or more suitable applications.

Further, the one or more presentation components 608 present data indications to a person or other device. Examples of one or more presentation components 608 include a display device, speaker, printing component, vibrating component, etc. Additionally, I/O port(s) 610 allow user device 600 to be logically coupled to other devices including I/O component(s) 612, some of which may be built in user device 600. Illustrative I/O component (s) 612 include a microphone, joystick, game pad, satellite dish, scanner, printer, wireless device, etc. Furthermore, power supply 614 may include any suitable source of power, such as a rechargeable lithium polymer battery and/or an alternating current power converter.

Turning to radio 616, the radio 616 facilitates communication with a wireless telecommunications network. For example, radio 616 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 616 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, massive MIMO, 3G, 4G, 5G, and/or 802.11 protocols and techniques, etc.

Illustrative wireless telecommunications technologies that radio 616 may facilitate include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies.

The invention claimed is:

1. A system for adapting a beamforming mode, the system comprising:
   an antenna array comprising one or more antenna elements; and
   one or more processors configured to execute operations comprising:
   receiving, at a base station associated with the antenna array, channel state information from one or more devices;
   based on the channel state information, determining whether an uplink signal measurement is above a first threshold and whether a downlink signal measurement is above a second threshold;
   based on determining that the uplink signal measurement is above the first threshold and whether the downlink signal measurement is above the second threshold, instructing the one or more antenna elements to schedule wireless transmissions utilizing open-loop beamforming; and after instructing the one or more antenna elements to schedule wireless transmissions utilizing open-loop beamforming:
1) Determining, using additional channel state information, that an additional uplink signal measurement is not above the first threshold and that an additional downlink signal measurement is not above the second threshold; and
instructing the one or more antenna elements to schedule the wireless transmissions utilizing closed-loop beamforming based on the additional uplink signal measurement not being above the first threshold and based on the additional downlink signal measurement not being above the second threshold; or
2) Determining that an additional uplink signal measurement is not above the first threshold and that an additional downlink signal measurement is above the second threshold; and
instructing the one or more antenna elements to schedule the wireless transmissions utilizing closed-loop beamforming based on the additional uplink signal measurement not being above the first threshold and based on the additional downlink signal measurement being above the second threshold.

2. The system according to claim 1, further comprising:
determining that the downlink signal measurement is above the second threshold, wherein the uplink signal measurement is a sound reference signal; and
instructing the one or more antenna elements to schedule the wireless transmissions utilizing the open-loop beamforming based on determining that the sound reference signal is above the first threshold and the downlink signal measurement is above the second threshold.

3. The system according to claim 2, wherein the channel state information is received from a user device, and wherein the one or more antenna elements are instructed to schedule the wireless transmissions utilizing the open-loop beamforming for the user device.

4. The system according to claim 1, further comprising:
determining that the downlink signal measurement is not above the second threshold, wherein the uplink signal measurement is a demodulation reference signal; and
instructing the one or more antenna elements to schedule the wireless transmissions utilizing the open-loop beamforming based on determining that the demodulation reference signal is above the first threshold and the downlink signal measurement is not above the second threshold.

5. The system according to claim 1, wherein the downlink signal measurement comprises a measurement from a precoding matrix indicator report and a measurement from a synchronization signal block beam.

6. A method for adapting a beamforming mode, the method comprising:
receiving channel state information;
based on the channel state information, determining that an uplink signal measurement is above a first threshold;
instructing an antenna element to schedule wireless transmissions utilizing open-loop beamforming based on determining that the uplink signal measurement is above the first threshold; and
dynamically instructing the antenna element to schedule the wireless transmissions utilizing closed-loop beamforming upon a later determination that the uplink signal measurement is below the first threshold.

7. The method according to claim 6, wherein the uplink signal measurement is a demodulation reference signal, and wherein the antenna element is instructed to schedule the wireless transmissions utilizing open-loop beamforming based on determining that the demodulation reference signal is above the first threshold.

8. The method according to claim 7, wherein the uplink signal measurement further comprises a sound reference signal, and wherein the antenna element is instructed to schedule the wireless transmissions utilizing open-loop beamforming based on determining that the sound reference signal is above the first threshold.

9. The method according to claim 8, further comprising:
determining, based on receiving the channel state information, that downlink signal measurements are above a second threshold, wherein the downlink signal measurements comprise a measurement from a precoding matrix indicator report and a measurement from a synchronization signal block beam index; and
instructing the antenna element to schedule the wireless transmissions utilizing open-loop beamforming based on determining that the downlink signal measurements are above the second threshold.

10. The method according to claim 6, wherein the wireless transmissions utilizing the open-loop beamforming are scheduled for a cell-level.

11. Computer-readable storage media having computer-executable instructions embodied thereon that, when executed by one or more processors, cause the one or more processors to perform operations comprising:
receiving cell-level channel state information from a neighboring access node of an antenna element;
determining a first threshold based on the cell-level channel state information;
based on the cell-level channel state information, determining that an uplink signal measurement is below the first threshold;
based on the cell-level channel state information, determining whether a downlink signal measurement is above a second threshold; and
instructing the antenna element to schedule wireless transmissions utilizing closed-loop beamforming upon determining that the uplink signal measurement is below the first threshold.

12. The media of claim 11, wherein the operations further comprise receiving the cell-level channel state information from a plurality of user devices and instructing the antenna element to schedule the wireless transmissions utilizing the closed-loop beamforming for a particular user device.

13. The media of claim 11, wherein the operations further comprise periodically receiving additional cell-level channel state information from a plurality of user devices and determining that the uplink signal measurement is below the first threshold based on the additional cell-level channel state information.

14. The media of claim 13, wherein the operations further comprise dynamically instructing the antenna element to schedule the wireless transmissions utilizing open-loop beamforming upon a later determination that the uplink signal measurement is above the first threshold based on the additional cell-level channel state information.

15. The media of claim 11, wherein the downlink signal measurement is based on a block error rate.

16. The media of claim 11, wherein the downlink signal measurement is based on a signal-to-noise ratio.

* * * * *